United States Patent
Kennedy et al.

(10) Patent No.: US 6,809,823 B2
(45) Date of Patent: Oct. 26, 2004

(54) METHOD FOR THE CALIBRATION AND ALIGNMENT OF MULTIPLE MULTI-AXIS MOTION STAGES FOR OPTICAL ALIGNMENT TO A PLANAR WAVEGUIDE DEVICE AND SYSTEM

(75) Inventors: William P Kennedy, Loveland, CO (US); John Bernard Medberry, Windsor, CO (US); David Washburn, Fort Collins, CO (US); Benno Guggenheimer, Fort Collins, CO (US); James D Adams, Boulder, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 212 days.

(21) Appl. No.: 09/967,451

(22) Filed: Sep. 28, 2001

(65) Prior Publication Data

US 2003/0063277 A1 Apr. 3, 2003

(51) Int. Cl.⁷ .............................................. G01B 11/00
(52) U.S. Cl. .................. 356/400; 250/227.27
(58) Field of Search .................. 356/399–401, 356/614–640; 385/96, 97, 52, 137; 250/559.36, 548

(56) References Cited

U.S. PATENT DOCUMENTS

| | | | | |
|---|---|---|---|---|
| 4,906,097 A | * | 3/1990 | Wiredemann | 356/375 |
| 5,187,375 A | * | 2/1993 | Masten | 250/561 |
| 5,218,184 A | * | 6/1993 | Hakoun et al. | 219/383 |
| 5,446,810 A | * | 8/1995 | Watanabe et al. | 385/22 |
| 5,525,808 A | * | 6/1996 | Irie et al. | 250/548 |
| 5,532,497 A | * | 7/1996 | Yasuzato et al. | 250/548 |
| 5,532,815 A | * | 7/1996 | Kipman et al. | 356/139.03 |
| 5,555,334 A | * | 9/1996 | Ohnishi et al. | 385/93 |
| 5,907,405 A | * | 5/1999 | Mizutani et al. | 356/399 |
| 5,926,272 A | * | 7/1999 | Curtis et al. | 356/326 |
| 5,999,268 A | * | 12/1999 | Yonezawa et al. | 356/399 |
| 6,062,742 A | * | 5/2000 | Yuuki | 356/88 |
| 6,256,436 B1 | * | 7/2001 | Nakama | 385/37 |
| 6,359,688 B2 | * | 3/2002 | Akimoto et al. | 356/401 |
| 6,360,041 B1 | * | 3/2002 | Nakama | 385/37 |
| 6,373,606 B1 | * | 4/2002 | Nakama | 359/130 |
| 6,495,847 B1 | * | 12/2002 | Asano et al. | 250/548 |
| 6,545,261 B1 | * | 4/2003 | Blake et al. | 250/227.27 |

* cited by examiner

Primary Examiner—Frank G. Font
Assistant Examiner—Willie Davis

(57) ABSTRACT

An optical system for detecting and coupling light to optical devices, and a method for aligning and calibrating the system. The system includes positioning stages and fiber sensors. The fiber sensors are used to detect the positions of calibration pieces and other sensors in a variety of configurations. From these detected positions, any misalignment of the sensors or positioning stages may be calculated and corrected for. The fiber sensors calibrate the system.

23 Claims, 14 Drawing Sheets

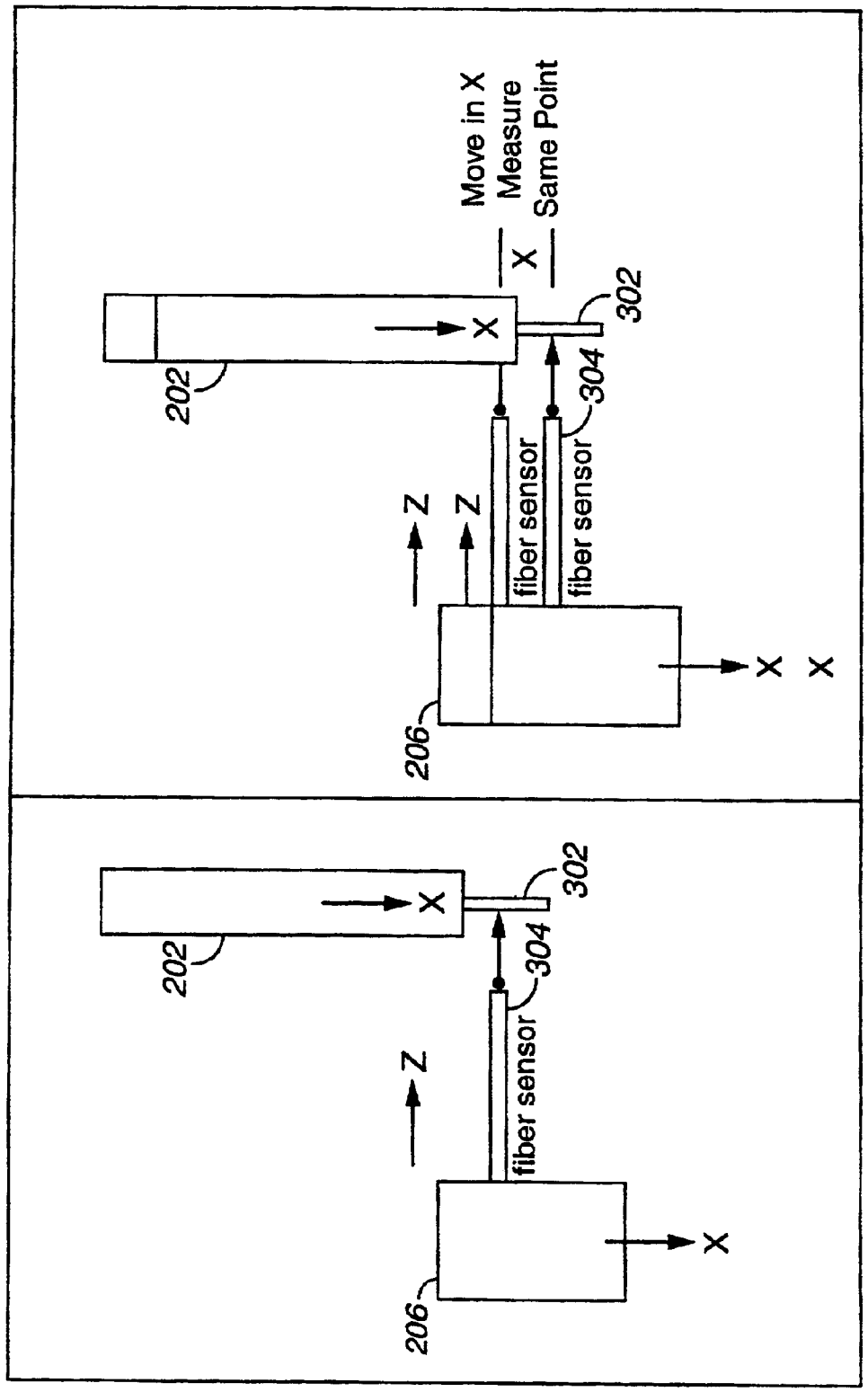

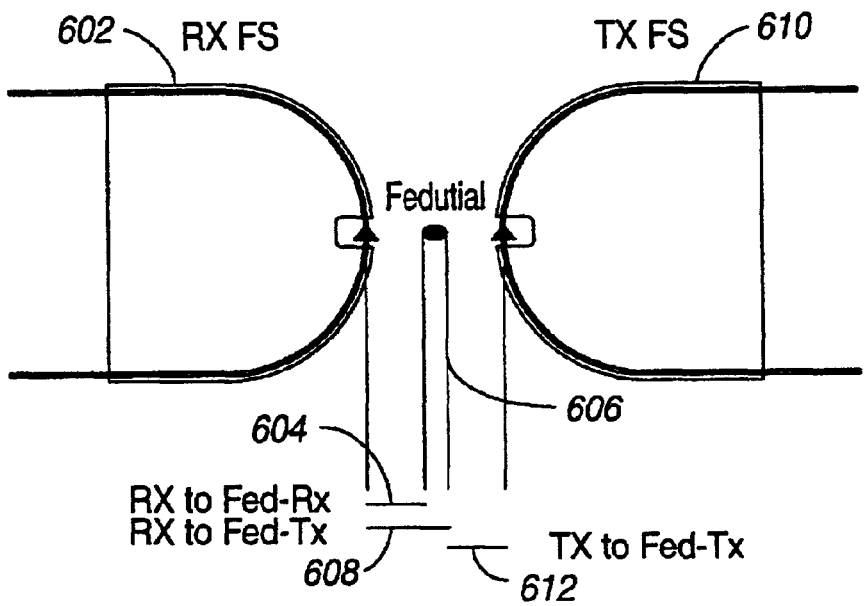
FIG. 6A  Z Axis Fedutial Calibration
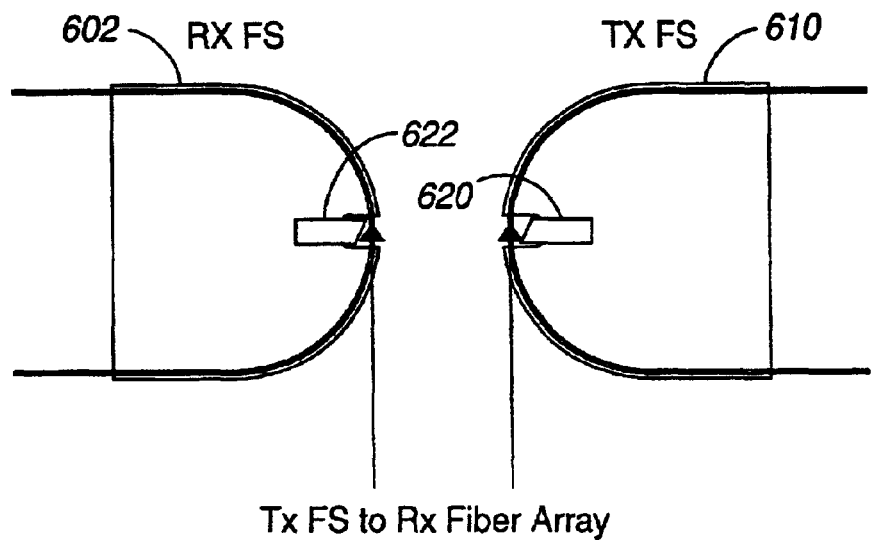
FIG. 6B  Z Axis Fiber Array Calibration

METHOD FOR THE CALIBRATION AND ALIGNMENT OF MULTIPLE MULTI-AXIS MOTION STAGES FOR OPTICAL ALIGNMENT TO A PLANAR WAVEGUIDE DEVICE AND SYSTEM

CROSS REFERENCE TO RELATED APPLICATIONS

The subject matter of the present application is related to copending U.S. application Ser. No. 09/935,018, titled "SUB-MICRON ACCURACY EDGE DETECTOR", which is assigned to Agilent Technologies, and copending U.S. application Ser. No. 09/967,453, titled "SYSTEM AND METHOD FOR COUPLING LIGHT THROUGH A WAVEGUIDE IN A PLANAR OPTICAL DEVICE", which will also be assigned to Agilent Technologies, filed herewith and having the same filing date, both of which are expressly incorporated herein by reference.

FIELD OF THE INVENTION

This invention relates generally to the field of assembly and test of electronic or optical components, such as integrated optical devices, and in particular to a method for aligning a test or assembly system.

BACKGROUND OF THE INVENTION

The assembly and test of devices, such as integrated optical devices, require accurate alignment of components. For example, the assembly process for coupling optical fibers to optical chip components currently requires mechanical positioning to within 1 micron or less. The mechanical repeatability of chip placement equipment or manual loading of an optical chip into a test and assembly station, however, is much greater than 1 micron. Thus the position of the mating edges of a chip with respect to the mating fibers is known to an accuracy of no better than several microns. Consequently, additional steps must be taken to achieve sufficient accuracy in the relative positions of the components.

One approach is the use of a microscope together with manual positioning of the components. This approach requires trained and skilled operators. This is expensive and is subject to human error.

Another approach is the use of video microscopes in combination with image processing software and computer control of the positioning device. This type of equipment is expensive and relatively slow, and measurement accuracy is limited to a few microns.

The equipment used in these approaches tends to obstruct other processing equipment required to complete the assembly and test processes.

A further approach is the use of a light source and a light sensor to detect the edge of an object. The amount of light reaching the detector is reduced as the object obstructs the light path between the source and sensor. The accuracy of this approach is limited by the size of the detector and the accuracy to which the intensity of the light can be measured. Variations in the transfer efficiencies from the input current to the light source to the output current of the sensor introduce variability into the system, which limit the accuracy of this type of device. U.S. Pat. No. 5,187,375 to Masten describes an edge detection device with two detectors with the aim of mitigating this problem. However, in systems of this type, the accuracy is limited firstly because the sensor is responsive to ambient light and light from the source and secondly because the size of the detector is large compared to the sub-micron accuracy required. In the Masten detector, the sensor is much larger than the source and has a length of 100 mils (0.1 inches).

A still further approach is laser interferometry, in which the phase difference between a transmitted and a reflected beam of monochromatic light is used to determine a position. The approach requires complex equipment and is very expensive.

Accordingly, there is an unmet need in the art for a method of aligning positioning stages and fiber sensors to a high degree of accuracy.

BRIEF SUMMARY OF THE INVENTION

The invention relates generally to an optical system for detecting and coupling light to optical devices, and to a method for aligning and calibrating the system. The system includes positioning stages and fiber sensors. The fiber sensors are used to detect the positions of calibration pieces or fiducials in a variety of configurations. From these detected positions, any misalignment of the sensors or positioning stages may be calculated and corrected for.

BRIEF DESCRIPTION OF THE DRAWINGS

The novel features believed characteristic of the invention are set forth in the claims. The invention itself, however, as well as the preferred mode of use, and further objects and advantages thereof, will best be understood by reference to the following detailed description of an illustrative embodiment when read in conjunction with the accompanying drawing(s), wherein:

FIG. 3 is a further diagrammatic representation of an axial alignment in accordance with one aspect of the invention.

FIG. 6A is a diagrammatic representation of a Z-direction fiducial calibration in accordance with one aspect of the invention.

FIG. 6B is a diagrammatic representation of a Z-direction fiber array calibration in accordance with one aspect of the invention.

DESCRIPTION OF THE INVENTION

Figure 1:
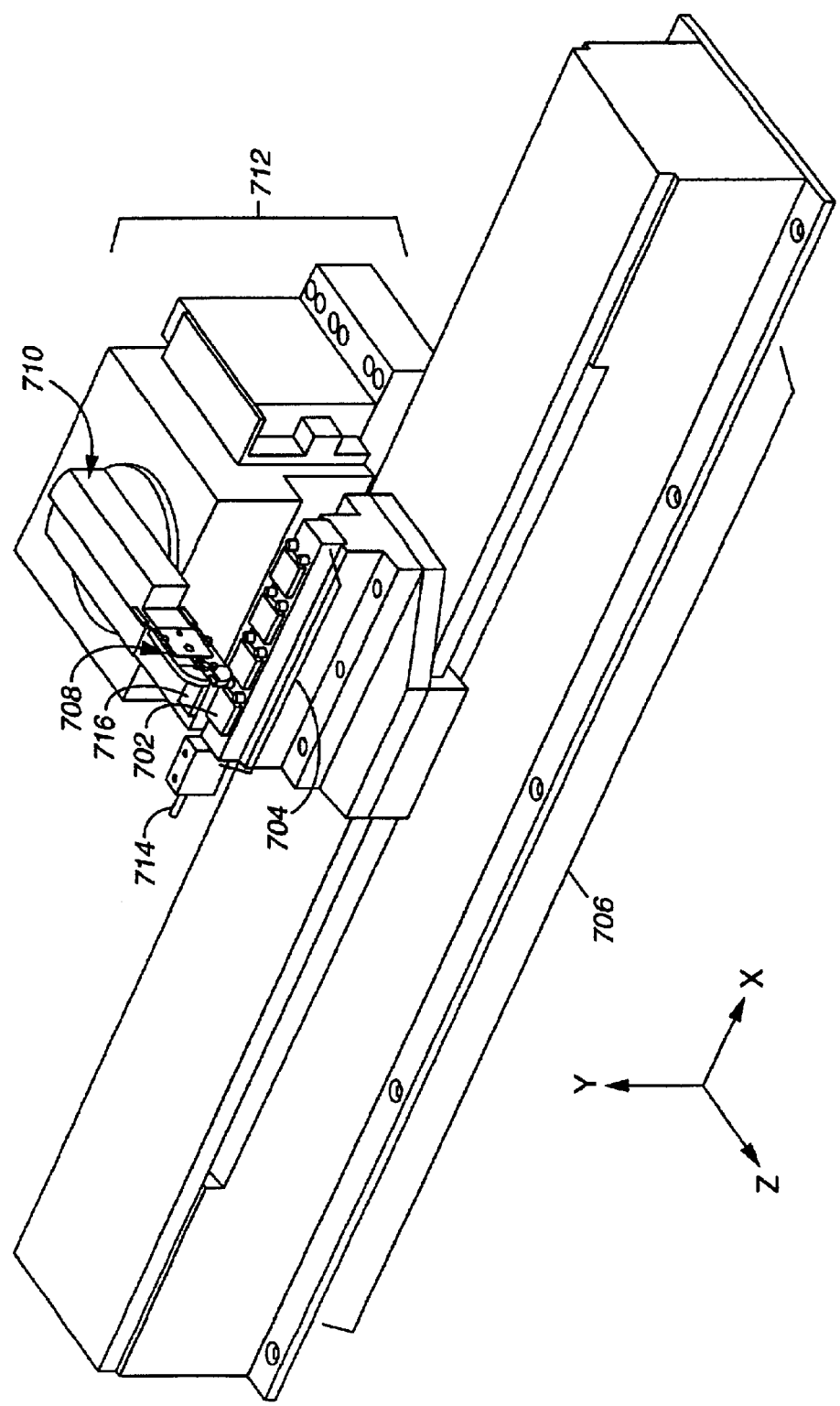
FIG. 1 is a representation of an optical system in accordance with the invention.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several Views of the drawings.

The invention relates generally to a process for calibrating and aligning potentially all stage axes and sensors of a test and assembly system that can be used to couple light to a planar or non-planar waveguide device. There are multiple steps in this process and each is explained in full detail. An exemplary embodiment is described in detail below. The apparatus includes two 5-axis automated motion control stage sets and a device presentation stage set with at least one axis of motion. In testing a planar optical waveguide device, light is transmitted to one side of the device and received on the other. The 5-axis positioning stage from which the light is transmitted is called the Transmit stage or TX stage. The 5-axis positioning stage from which the light is received is called the Receive stage or RX stage. The stage carrying the device is called the center stage, since it generally lies between the Transmit and Receive stages. Generally, the center stage is capable of motion in a single direction, which is denoted as the X-direction. In the description below, the X-direction is taken to be horizontal, but this is not a requirement and the invention is not so limited. The Transmit stage and Receive stage are capable of motion in three perpendicular directions denoted by X, Y and Z. They may also be capable of rotation about the Y-axis (yaw) and the Z-axis (roll). In a further they may also be capable of rotation about the X-axis (pitch) Each of the stages is controlled by a computer. Each of the two 5-axis stages has a transmit or broadcast fiber sensor coupled to a laser light source. A fiber array is mounted on each of the two 5-axis stages. One of the 5-axis stage's fiber array has a single transmit laser coupled to it, while each fiber of the other 5-axis stage's fiber array is a receiving side and is connected to a power sensor. The present invention provides a method for aligning the three stage sets and the fiber arrays. The present invention also provides a method of coupling light to planar and non-planar optical waveguides.

FIG. 1 shows an exemplary system comprising a center stage 706 and a transmit stage 712. For clarity, the receive stage, which would be positioned opposite the Transmit stage on the other side of the center stage, is not shown. Referring to FIG. 1, an object 702 with an edge to be detected is placed in holder 704, which is in turn mounted on the center (object positioning) stage 706. The position of the holder 704 along the length of the center (object positioning) stage 706 may be adjusted by a linear servo-motor or other suitable adjustment means. The edge detection device or sensor 708 is mounted on positioning platform 710, which is in turn mounted on the Transmit stage 712. In the preferred embodiment, the edge detection device includes a transmit optical fiber coupled to a laser light source and a receive optical fiber coupled to a light power detector. The two fiber are aligned co-axially in opposition, so that light from the transmit optical fiber is received by the receive optical fiber. In a further embodiment, a pair of transmit optical fibers, parallel to one another, is used together with a corresponding pair of receive optical fibers. The position of the holder 710 relative to the Transmit stage may be varied by a linear servo-motor in a direction perpendicular to the Center stage 706. An edge detector calibration fiducial 714 is attached to the holder 704 at a known location and is used in the calibration of the edge detector. The fiducial 714 can be used to calibrate the position stage, so that the relative positions of the stage and the detector are known. The directions or axes X, Y and Z are indicated in the figure. The positioning stage also supports test or assembly parts 716, which can be coupled to a device under test.

Mounting of Stages

The first stage of the process is to mount the positioning stages to within machine precision. For the initial alignment and calibration, the fiducial 714 is positioned in proximity to the sensor 708.

Axes Alignment

Figure 2B:
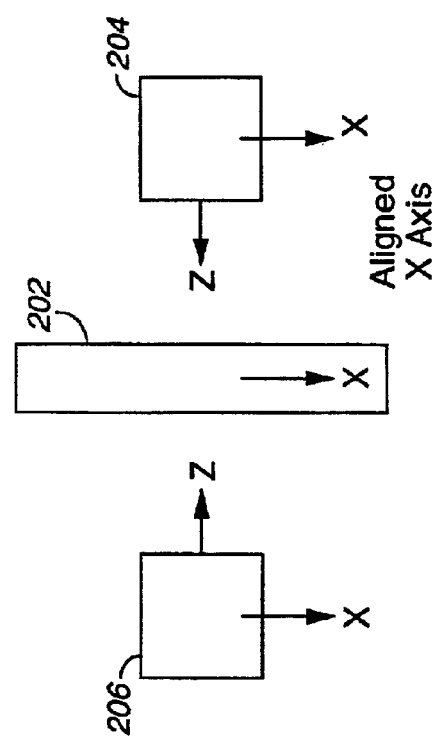
FIG. 2 is a diagrammatic representation of an axial alignment in accordance with one aspect of the invention.
Figure 2A:
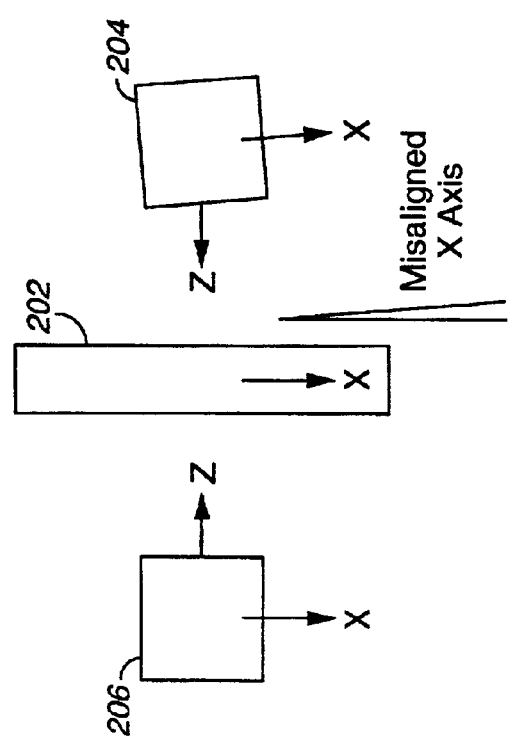

The next step is to correct for miscorrelation between stage axes. Each stage set Transmit, Center, Receive has a basic orthogonal axes set related to the motion of that stage set. However, when first mounted, the degree to which they are parallel can be very low, on the order of a degree or so. In order to correct for this the Receive and Transmit X-axes are corrected to the motion of the Center stage. To do this, first consider the Center and one of the other stages. FIGS. 2A and 2B, show two diagrammatic representation of the system as viewed from above. The system includes Center stage 202, Transmit stage 204 and Receive stage 206. FIG. 2A shows an exaggerated misalignment in the X-axis of the Transmit stage (shown on the right of the figure). FIG. 2B shows the corrected alignment.

Referring to the leftmost figure in FIG. 3A, the Center stage 202 is moved in the X-direction from some nominal starting position to a point $x_1$ where the fiducial 302 that is mounted to it is accessible by the fiber sensor 206 of the Receive stage 206. This motion may be caused by manual or automatic operation. The fiber sensor of the Transmit stage is moved in to the fiducial, in the Z-direction, measuring the crossing point $z(x_1)$. As shown in FIG. 3B, both stages, Center and Receive, are moved several millimeters in the X-direction to a new position $x_2$, and the same physical point is measured again with the fiber sensors in the Z-direction. The new measurement is $z(x_2)$. This yields the degree of slope between the two X axes, namely $$\theta = \tan^{-1}\left(\frac{z(x_2) - z(x_1)}{x_2 - x_1}\right).$$

This angle is propagated through all translations to correct for the angular misalignment. Any offset in the Z distance over the two X-positions yields the angle of offset between the two Axes. The misalignment is then corrected, and the process is repeated using the opposite stage set.

Fiber Array Yaw Measurement

Figure 4:
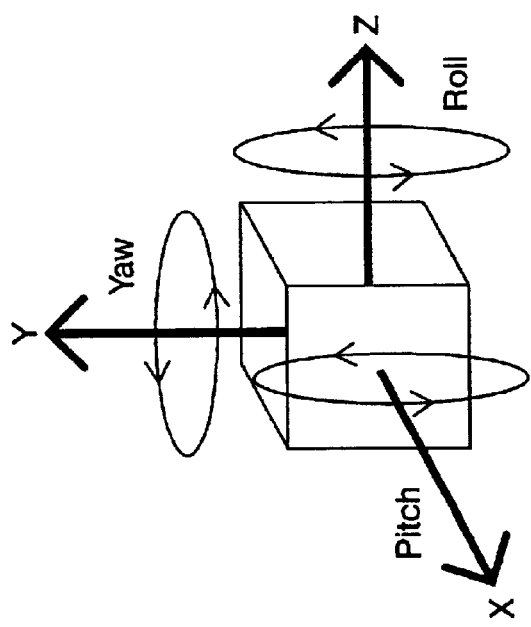
FIG. 4 is a diagram illustrating the notation used for rotations used in the description of the invention.

At this point, any movement along the X-direction of any of the stages is parallel. However, the fiber arrays may not be sitting within their fixtures any more accurately than the stages were mounted. The direction under consideration is Yaw, which is the angular axis that pivots about the Y axis. This is shown in FIG. 4, as well as the other two angular axes, Pitch and Roll. The basic 5 axis system has X, Y, Z, Yaw and Roll.

Figure 5:
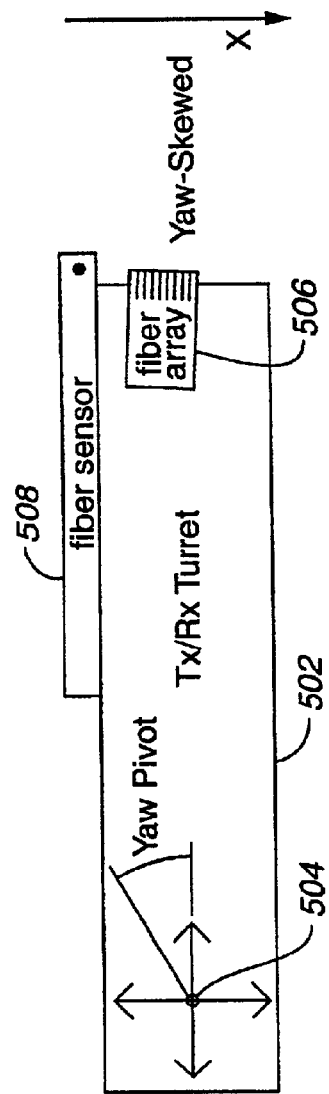
FIG. 5 is a diagrammatic representation of a fiber array alignment in accordance with one aspect of the invention.

The angular offset of the fiber array is corrected by pivoting the full turret around the Yaw axis. Referring to FIG. 5, the turret 502 is pivoted about pivot point 504 so as to align the edge of the fiber array 506 to be parallel to the X-direction. The fiber sensor is shown as 508. This is done in the following manner. The fiber sensor of the opposite stage set, say Receive, is positioned so that it is accessible by the Transmit axis. The fiber array is moved in, sensing the leading edge of the glass, giving a position $z(x_1)$. Then the Transmit axis is shifted in the X-direction over some length, and another point on the fiber array is measured with the same stationary sensor, giving the position $z(x_2)$. This gives the degree of angular offset of the fiber array leading edge relative to the motion axis of the stage that it is sitting on. The angle is given by $$\phi = \tan^{-1}\left(\frac{z(x_2) - z(x_1)}{x_2 - x_1}\right).$$

This amount is applied as a correction to the turret Yaw axis, and is then re-measured. The procedure may be repeated, if necessary, until $z(x_1)=z(x_2)$. The same process is followed for the other array on the opposite stage. If the edge detector includes a pair of transmit optical fibers and a pair of receive optical fibers, the two measurements in the X-direction may be made without having to relocate the sensor positioning stage in the X-direction. In general, using pairs of optical fibers is useful for compensating for yaw.

Sub-Micron Calibration in the Z-Direction: Edge Location

This process combines the physical measurement of the fiducial from each axis and the measurement of the location of the fiber array on the opposite axis to allow for sub-micron knowledge of the location of the fiber array with respect to its own fiber sensor. The measurement allows for positioning along the Z-axis to another edge to better than a micron. It is preferable that Yaw calibration is performed first, otherwise it would change the resultant measurement of this distance. This is because this distance is the projection of the straight-line (shortest route) length onto the arbitrarily oriented Z-axis.

Returning the fiducial to an accessible position, the edge of the fiducial must be sensed—on both sides—by a single fiber sensor. FIGS. 6A illustrates the measurements made. The Receive fiber sensor 602 is used to measured the distance 604 to the side of the fiducial 606 nearest to the Receive sensor and the distance 608 to the opposite side of the fiducial 606. The Transmit fiber sensor 610 is used to measure the distance 612 to the transmit side of the fiducial 606. The measurement made on the opposite side of the fiducial, as shown in FIG. 6A, allows for a global reference point in the Z axis. This allows for absolute referencing from the Transmit fiber sensor to the Receive fiber sensor.

Next, the fiber array of each side is measured by the opposite fiber sensor as shown in FIG. 6B. This allows for knowledge of the location of the leading edge of the fiber array with respect to the same fiber sensor. The Receive fiber sensor 602 is used to measure the position of the Transmit fiber array 620 and the Transmit fiber sensor 610 is used to measure the position of the Transmit fiber array 622.

Figure 7:
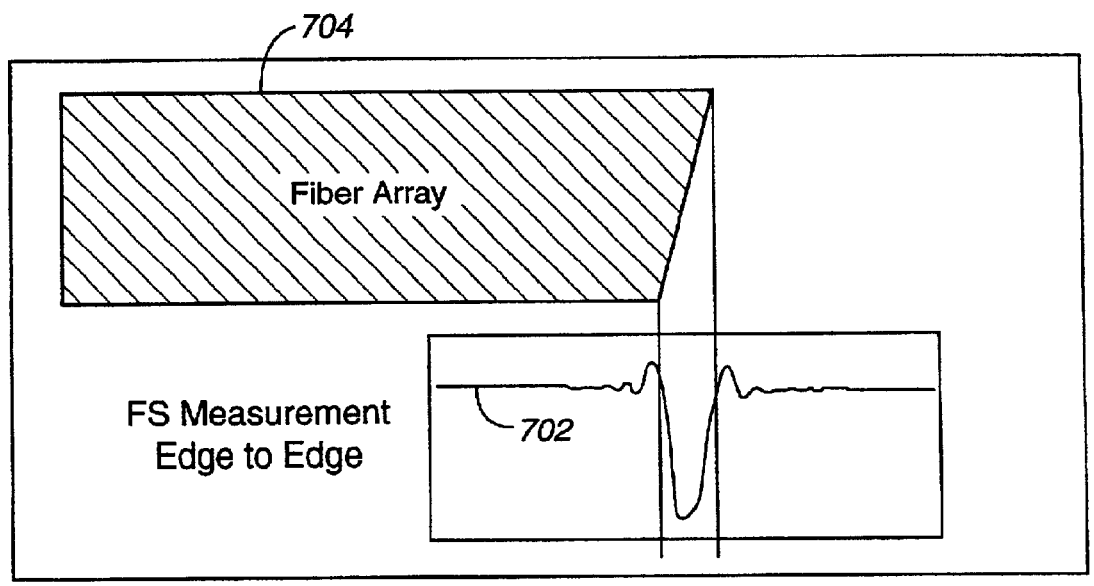
FIG. 7 is a diagrammatic representation of the detection of the edges of fiber array in accordance with one aspect of the invention.

In addition, the trailing edge of each fiber array is found, as shown in FIG. 7. The graph 702 in FIG. 7 shows the output from the fiber sensor as a function of position as is it moved across the fiber array 704.

This measurement, coupled with a physical measurement using micrometers of the height of the fiber array prior to loading, gives a very accurate picture of the location of the end of the fiber. This is achieved by allowing for the fact that the Z distance between the two edges gives the projection onto the Z-axis of the polished face, which reveals that the angle of the polish is equal to the Arc Tan(Z/Y). Y can be measured to +/−10 microns or ~0.1%. This allows an accurate measure of the angle (which is only specified by the manufacturer to within 0.5 degrees). Hence the angle, which is nominally 8 degrees, is known to within 0.1%. The fiber is located on the V-groove block with a known height (<1 micrometer). Using the second edge of from the fiber sensor, the distance from that edge to the end of the core of the fiber can be found accurately. This is important for fiber to fiber and fiber to device alignment.

Sub-Micron Calibration in the X-Direction: Fiber Location

This process determines the location of the fiber within the fiber array along the X axis. The basic principle is the same as that of the Z-axes calibration. There needs to be a global reference point in terms of X between the two fiber sensors that will then be used to reference relative information between the sensor pairs.

First, the fiducial position is re-measured, but this time in the X-direction, and as close as possible at the same Z location on the fiducial. This is done by sensing the extended edge of the fiducial, which also is preferably ground to a sharp edge. First one fiber sensor is located by translating to the middle of the fiducial and then translated across it in the X-direction, then this is repeated for the other fiber sensor. This edge represents the global reference that ties the two sensors together.

Figure 8:
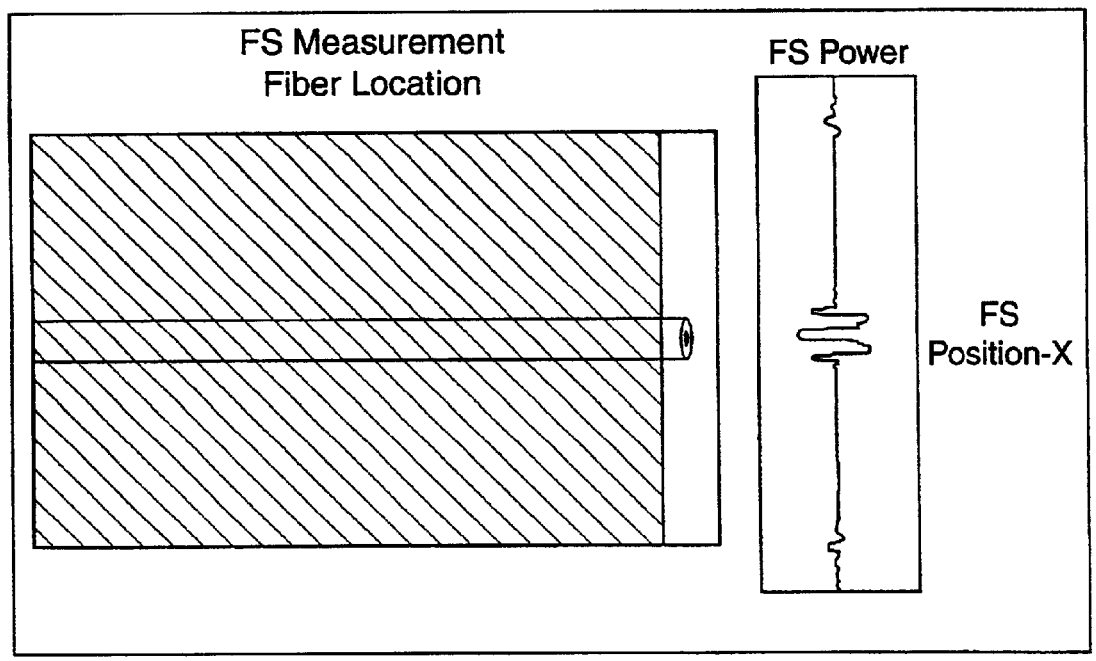
FIG. 8 is a diagrammatic representation of the detection of a fiber sensor in accordance with one aspect of the invention.

Next the Receive fiber sensor is used to sense the location of the fiber within the Transmit fiber array. FIG. 8 is a diagrammatic representation of this process together with a representation of the information gleaned from this action. With a small amount of processing, the location of the Transmit fiber may be determined to better than one micron in the X-direction.

This same basic procedure is performed on the Receive fiber array, with a slightly different processing algorithm to allow for multiple fibers.

Next in the procedure a fiber to fiber alignment is performed, which also yields the final calibration parameter, Y. As all angles are corrected at this point and the Z- and X-axes are know to better than a micron, the optical path is brought to a close region, to within 100 microns edge to edge. Then a scan in the Y-direction of one of the axes yields the starting point for the fiber to fiber optimization.

The optimization is performed, the Z distance is reduced, optimization is repeated and Z is moved closer again. This is repeated until it is safe to move to within a distance of about one micron. The distance is preferably less than one micron for stability and repeatability. The shape of the loss functions in each angular and linear dimension allows the throughput to be variable to less than 0.05 dB at this distance. This step can include calculation of the true location of the fiber end. This is done by storing (at the point of array load) information about the fiber array. For example, the height is used to calculate the angle of the polish from the above found information. The next datum is the height of the lower piece of the glass array that contains the V-block. The angle is applied to this value and the Z depth of the fiber is found using trigonometric calculations.

The core to core accuracy can be evaluated either by the insertion loss or by the RSS of the propagated errors in each step of the measurement. Each of these approaches is bound by the 0.05 dB insertion loss variability. This means that if the total deviation is <0.05 dB, the core mismatch and the inaccuracy in the Z-direction are bounded by delta x-y physical constraints.

Although the adjustments have been treated as being separable, they may alternatively be made in combination.

Roll Calibration

Next, an optical calibration of the system is performed. This entails bringing the two glass fiber arrays together and measuring the power on each channel. However, the Roll degree of freedom should first be corrected. The Receive fiber array is a multi-channel device, whereas the Transmit is a single channel device. Consequently, the Receive fiber is much more sensitive to angular displacement pivoting about the Z-axis. To correct for Roll, the two fiber arrays are brought very close together, to within about 100 micrometers. Then a power optimization routine is executed on one Receive channel. The Transmitting single fiber array is then moved to the last channel of the Receive fiber array and the Roll axis is optimized. This however generates a displacement in the original optimization, since it may not be possible to maintain sufficient machine tolerances to have the glass pivot about one of the fiber channels. An iterative procedure may be performed, slowly walking in the Roll axis, re-optimizing the initial channel and the Rolling in the other channel. Within a few iterations they are the same to within arbitrary accuracy.

Yaw Calibration

Figure 9:
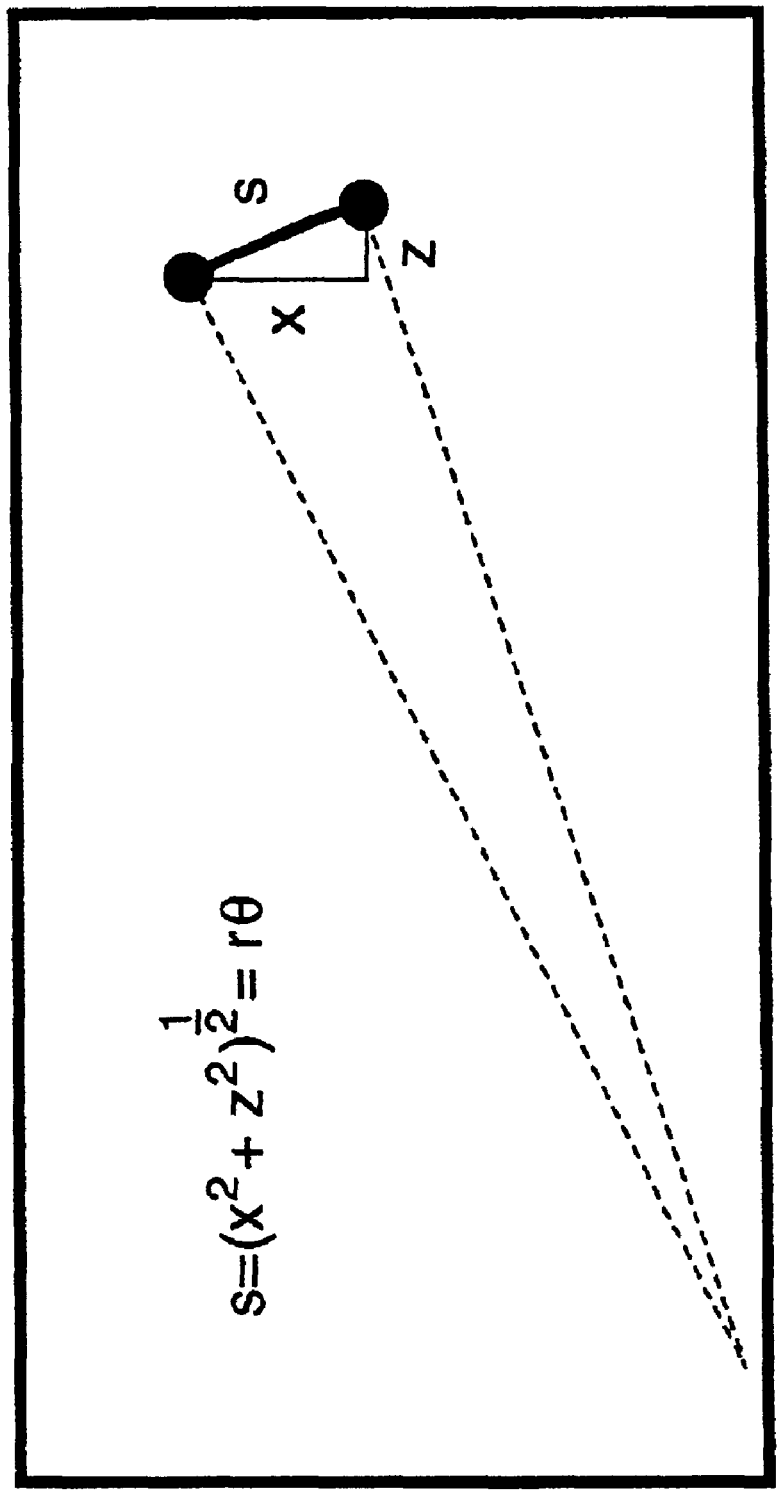
FIG. 9 is a diagram illustrating the notation used for yaw rotations used in the description of the invention.

An experimental Yaw move may be made following the fiber calibration. After this the two X- and Z-positions of the fiducial are found. From this the arm length s in FIG. 9, can be determined. The arm length s is given by $$s = r\theta \approx (x^2 + z^2)^{1/2}$$

where x and z are the change in positions in the X- and Z-directions respectively, r is distance of the fiducial from the pivot point of the yaw motion and θ is the angle of the motion (in radians). The approximation of the arc-length by the straight-line distance is only good for small angle, so the move should be less than or equal to 0.1 degrees. For example, a 122 mm arm length would give about a 213 micron x value and a 0.19 micron z value, and an approximate arc length of 213 micron (y is less than one tenth of a percent and may be neglected). The accuracy of the approximation is better than one part per million, actually $\Delta = 1.269 \times 10^{31}\ ^5\%$ on the 122 mm. This is sufficient to allow for correcting the angular displacement applied for Yaw to correct parallelism to the device under test.

Full Alignment to Device-Planar Waveguide Circuit

Except for Roll, every process is performed with each stage axis. One side is now described in detail as an example.

Locating Device Under Test:

First the general position of the device under test is located with the fiber sensors. This is done using edge detection.

Next the Yaw of the device under test, as located within its fixture must be determined. This is so that the incoming fiber array may be rotated to come in as close to parallel as possible to the device under test edge. This is similar to the yaw calibration described above for the fiber arrays, in that two Z depths are measured at different X positions, with the angle calculated and applied.

Once the device under test Yaw correction has been applied, the requisite X- and Z-transformations are applied to all further movements (so as to preserve the calibration so performed so far). Then the device under test is approached.

First, the leading edge of the device under test is sensed and then one of the plus or minus X edges is sensed. From the X-edge, with the fiber sensor fully interrupted and returned, the device under test is traversed in the X-direction to detect the location of the waveguides in the device.

The primary motivation for this is that there is not just a single input and that may be a multiple set of outputs (depending upon which input is used). A device map for the particular device under test, which may be stored in electronic form on a computer, will dictate the number of inputs, whether they are uniform or vernier, and the spacing of the inputs, as well as including any 'through channels'. This information may be used to determine whether or not the waveguide is a viable channel for the device under test. The same is true for the output.

Once all of the waveguides are mapped, alignment to the device under test can begin. Channel selection may be either automatically set (for example: First go to channel P, if not the right pass band, go to channel Q), or manually set a user of the system. For example, the device may have five valid waveguide channels that correspond to channels in the device map. The user may then select which input and output channels to measure first.

If the selection is performed automatically, a manual override may be provided.

Once the input waveguide is selected this determines the set outputs. Preliminary X, Y, Z alignment is performed. The Y-measurement is an approximation at this point. The next step is first light.

The waveguides in the device under test may be straight, curved or angled. The sensor positioning stages are typically capable of motion in several degrees of freedom, and so may be moved to couple light from any face of the device under test. In addition, the waveguides need not be planar. The edge detection method of the present invention may be used for non-planar waveguides, since the location of the waveguides can be determined using the fiber sensors and fiber arrays.

The performance of the system may be dependent upon the wavelength of the light used for measurements or testing. Accordingly, the system is preferably capable of using a light of different wavelengths. The wavelength of the light may be selected manually or automatically.

Summary of the Methods

Figure 10:
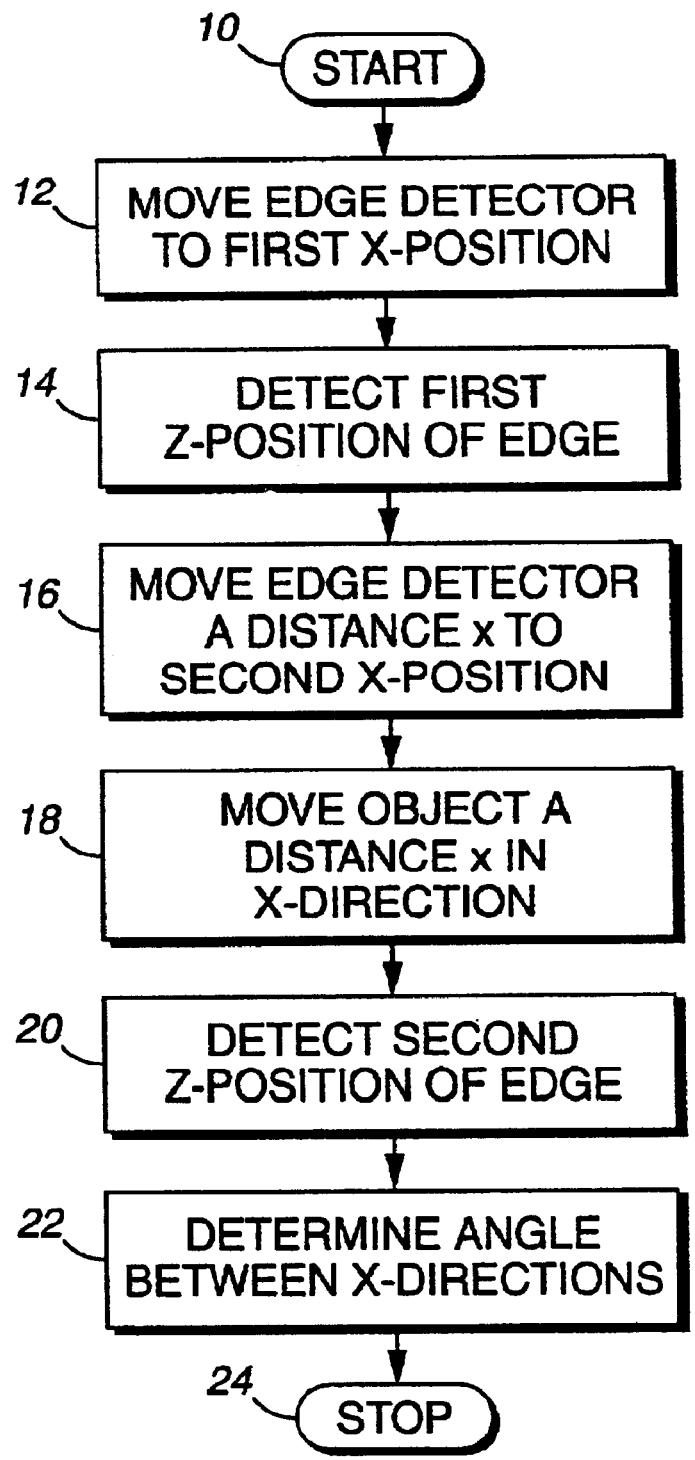
FIG. 10 is a flow chart depicting a method for X-axis alignment in accordance with one aspect of the invention.

FIG. 10 is a flow chart depicting a method for aligning an optical system. The system includes a device presenting positioning stage capable of motion in an X-direction, an object attached to the device presenting positioning stage, one or more sensor positioning stages each capable of motion in an X-direction and a Z-direction. Each sensor positioning stage has an optical edge detector attached to. Referring to FIG. 10, the method begins at start 10. Then, for each sensor positioning stage, the method proceeds by positioning the optical edge detector of the sensor positioning stage at a first X-position in the X-direction at block 12, causing the sensor positioning stage to move the optical edge detector in the Z-direction to detect a first Z-position of an edge of the object at block 14, causing the sensor positioning stage to move the optical edge detector by a distance x in the X-direction to a second X-position at block 16, causing the device positioning stage to move the object by a distance x in the X-direction at block 18, causing the sensor positioning stage to move the optical edge detector in the Z-direction to detect a second Z-position of an edge of the object at block 20 and determining an angle between the X-direction of the sensor positioning stage and the edge of the object according to the first Z-position, the second Z-position and the distance x at block 22. The process terminates at block 24. The angle θ between the edge of the object and the axis of a sensor positioning may be calculated as $$\theta = \tan^{-1}\left(\frac{z(x_2) - z(x_1)}{x_2 - x_1}\right),$$

where $x_1$ and $x_2$ denote said first and second X-positions respectively and $z(x_1)$ and $z(x_2)$ denote said first and second Z-positions respectively.

The object may be a fiducial attached to the Center positioning stage or a device under test.

Figure 11:
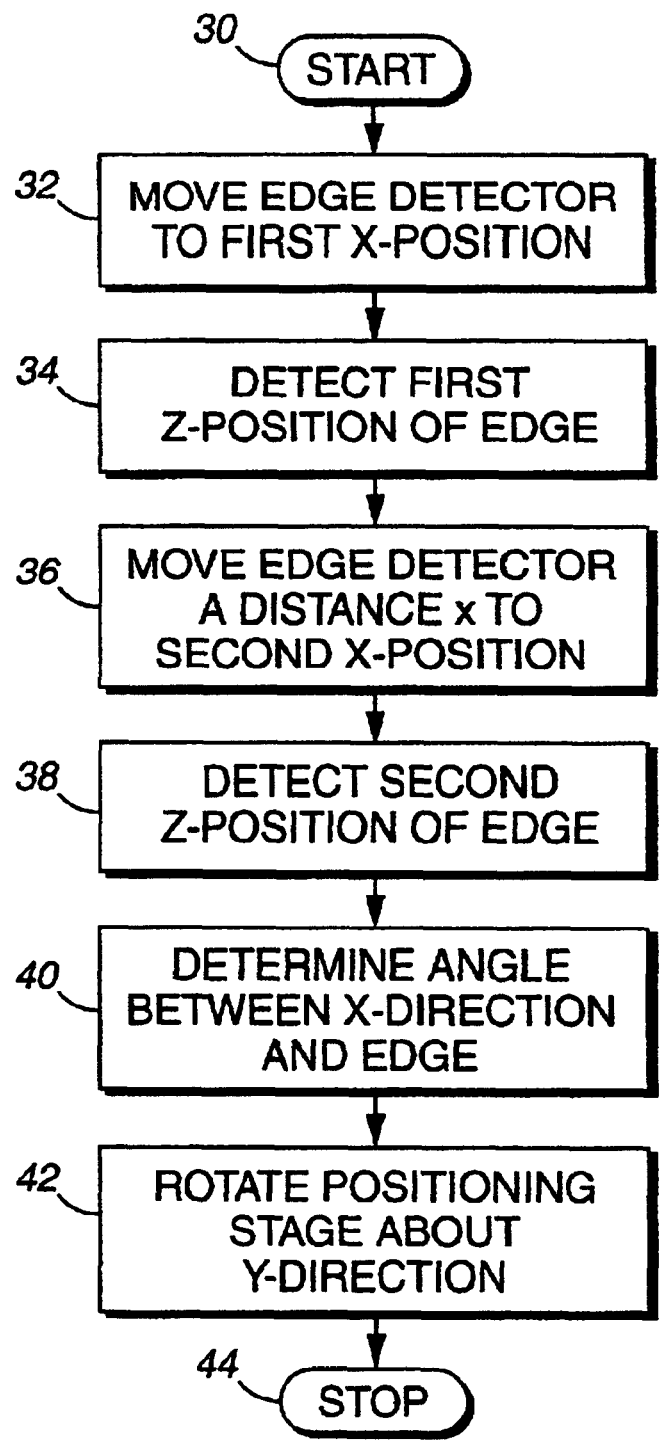
FIG. 11 is a flow chart depicting a method for yaw alignment in accordance with one aspect of the invention.

FIG. 11 is a flow chart depicting a further method for aligning an optical system, using rotation. The system includes a first sensor positioning stage capable of motion in an X-direction and a Z-direction orthogonal to the X-direction, an optical edge detector attached to the first sensor positioning stage, a second sensor positioning stage capable of rotary motion in a Y-direction, orthogonal to the X-direction and the Z-direction, and an object attached to the first sensor positioning stage. The method begins at start block 30 and proceeds by positioning the first optical edge detector at a first X-position in the X-direction at block 32, causing the first sensor positioning stage to move the optical edge detector in the Z-direction to detect a first Z-position of an edge of the object at block 34, causing the first positioning stage to move the optical edge detector by a distance x in the X-direction to a second X-position at block 36, causing the first sensor positioning stage to move the optical edge detector in the Z-direction to detect a second Z-position of an edge of the object at block 38 and determining an angle between the X-direction of the first sensor positioning stage and the edge of the object according to the first Z-position, the second Z-position and the distance x at block 40 and rotating the second sensor positioning stage about the Y-direction in accordance with the angle between the X-direction of the first sensor positioning stage and the edge of the object at block 42. The method terminates at block 44.

Figure 12:
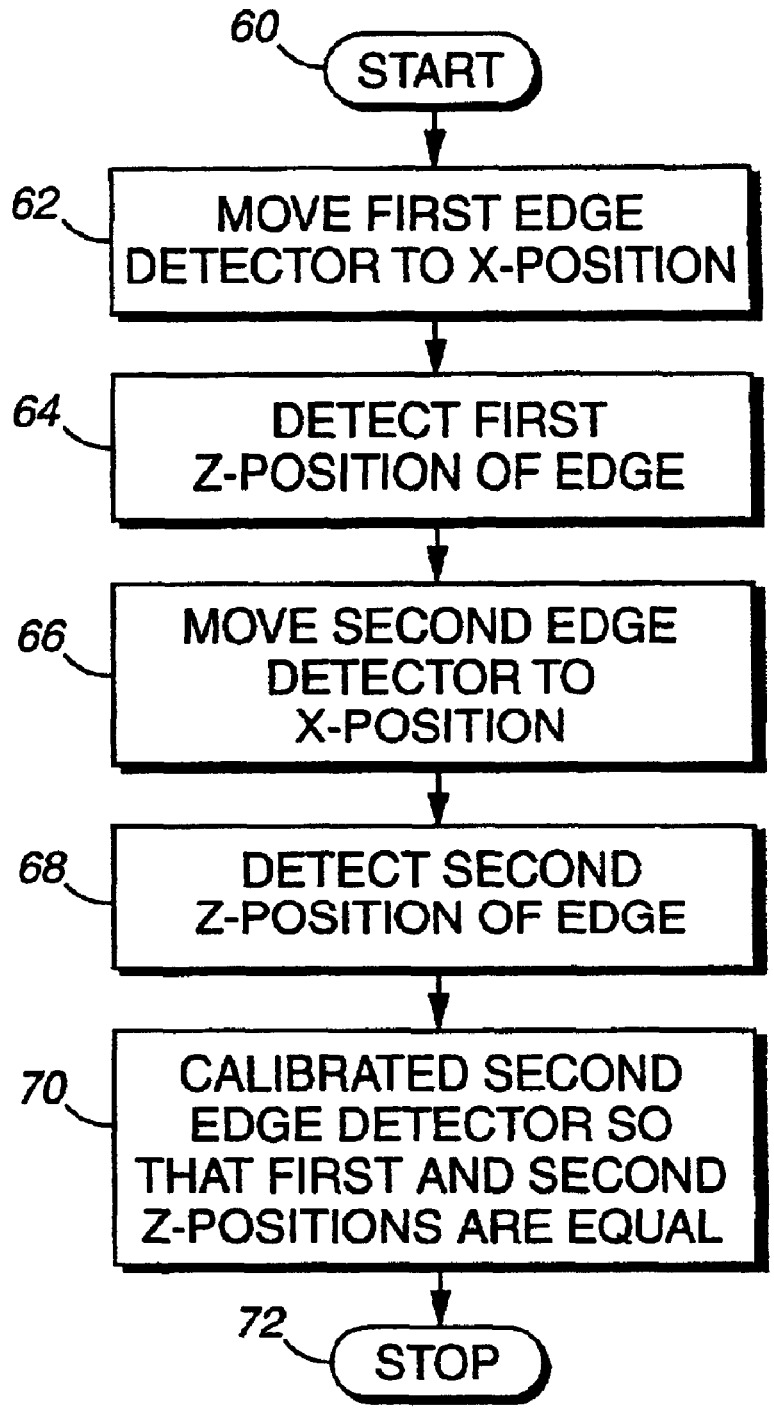
FIG. 12 is a flow chart depicting a method for calibration in a Z-direction in accordance with one aspect of the invention.

FIG. 12 is a flow chart depicting a method for calibrating an optical system in the Z-direction. The system includes a device presenting positioning stage capable of motion in an X-direction, a object attached to the device presenting positioning stage, a two or more sensor positioning stages each capable of motion in an X-direction and a Z-direction substantially orthogonal to the X-direction. Each sensor positioning stage has an optical edge detector attached to it. The method begins at start block 60 and proceeds by positioning the optical edge detector of one of the sensor positioning stage at an X-position in the X-direction at block 62 and causing the sensor positioning stage to move the optical edge detector in the Z-direction to detect a first Z-position of an edge of the object at block 64. Then, for each additional sensor positioning stage the method proceeds by positioning the optical edge detector of the additional sensor positioning stage at an X-position in the X-direction at block 66 and causing the additional sensor positioning stage to move the optical edge detector of the additional sensor positioning stage in the Z-direction to detect a second Z-position of an edge of the object at block 68. The optical edge detector of the additional sensor positioning stage is calibrated at block 70 so that the second Z-position is equal to the first Z-position. The method terminates at block 72.

Figure 13:
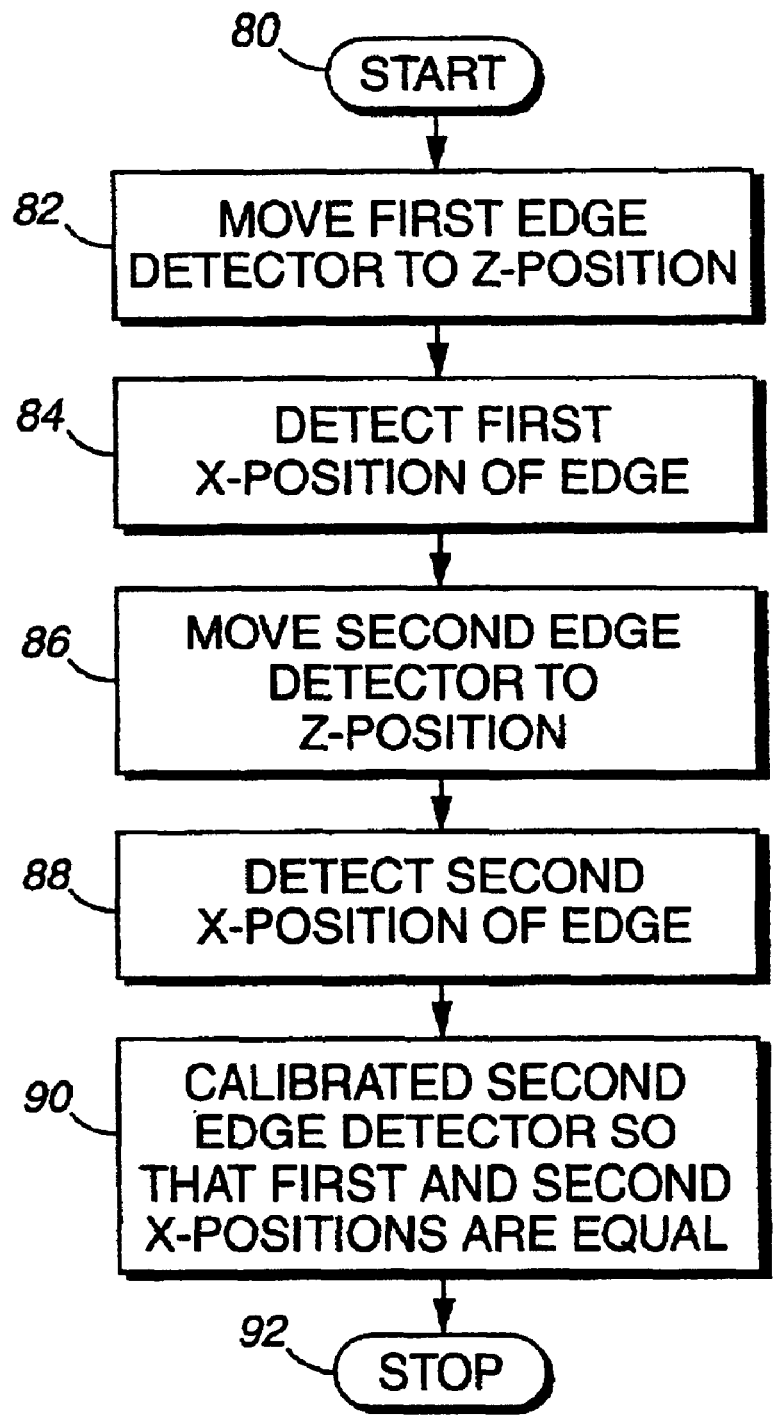
FIG. 13 is a flow chart depicting a method for calibration in an X-direction in accordance with one aspect of the invention.

FIG. 13 is a flow chart depicting a method for calibrating an optical system in the X-direction. The system includes a device presenting positioning stage capable of motion in an X-direction, a object attached to the device presenting positioning stage and two or more sensor positioning stages each capable of motion in an X-direction and a Z-direction substantially orthogonal to said X-direction. Each sensor positioning stage has an optical edge detector attached to it. The method begins at start block 80, and proceeds by positioning the optical edge detector of a first sensor positioning stage in the Z-direction at an Z-position on an edge of the object substantially parallel to the Z-direction at block 82 and causing the first sensor positioning stage to move the optical edge detector in the X-direction to detect a first X-position of the edge of the object substantially parallel to the Z-direction at block 84. Then, for each additional sensor positioning stage the method proceeds by positioning the optical edge detector of the additional sensor positioning stage in the Z-direction at the Z-position on the edge of the object substantially parallel to the Z-direction at block 86 and causing the additional sensor positioning stage to move the optical edge detector of the additional sensor positioning stage in the X-direction to detect a second X-position of the edge of the object substantially parallel to the Z-direction at block 88. The edge detector of the additional sensor positioning stage is calibrated at block 90 so that the second X-position is equal to the first X-position. The method terminates at block 92 once all additional edge detectors have been calibrated.

Figure 14:
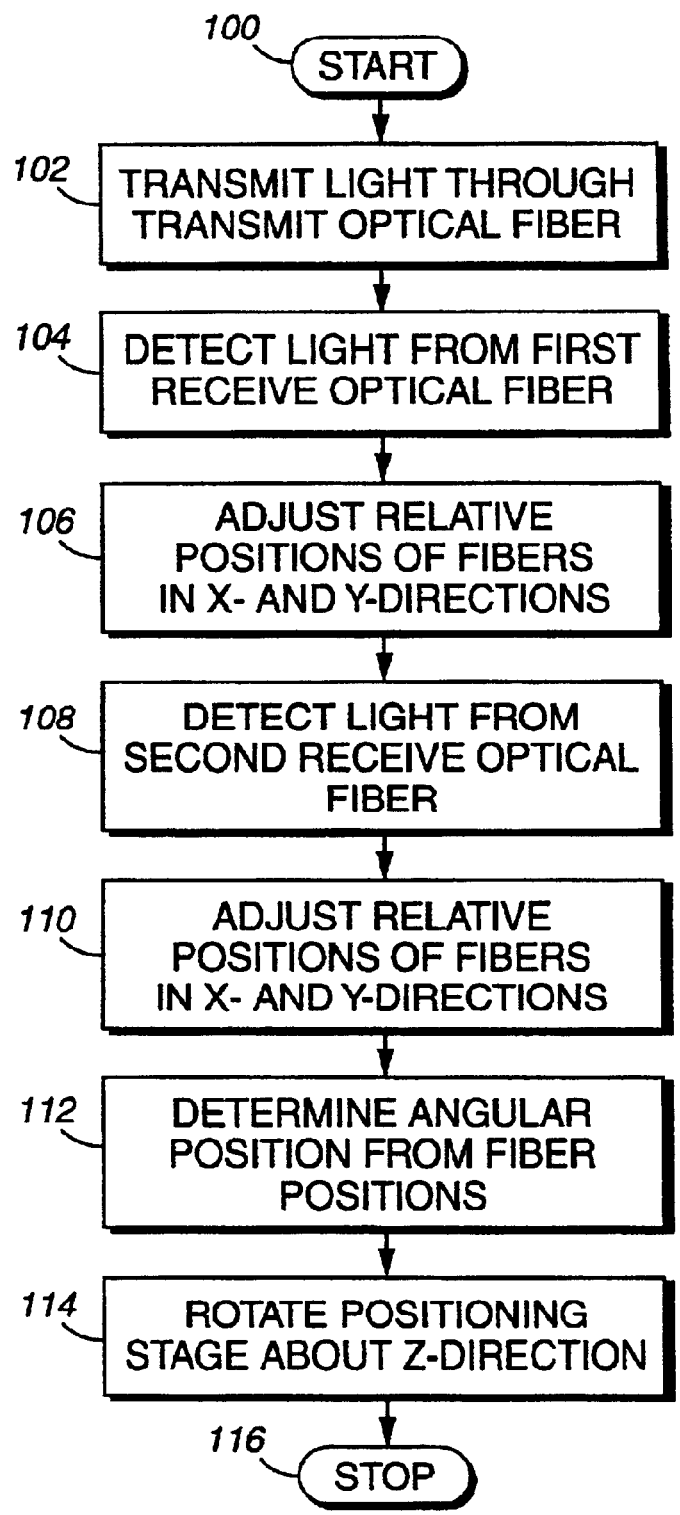
FIG. 14 is a flow chart depicting a method for roll alignment of a fiber array in accordance with one aspect of the invention.

FIG. 14 is a flow chart depicting a method for aligning an optical system, the optical system includes a first sensor positioning stage capable of motion in orthogonal X-, Y- and Z-directions that has an transmit optical fiber attached to. The optical system also includes a second sensor positioning stage that has holds a fiber array. The fiber array has a surface substantially parallel to the Y-direction and containing two or more receive optical fiber terminating in the surface. The method begins at start block 100 and proceeds by causing light to be transmitted from the transmit optical fiber at block 102, detecting light received through one of the receive optical fibers at block 104. The relative positions of the transmit optical fiber and the receive optical fiber are then adjusted in the X- and Y-directions at block 106 to find the position where the power of the detected light is maximized. The position where the light is maximized is used to determining the position of the receive optical fiber. The process is then repeated at block 108 and 110 for one or more additional receive fibers. At block 112 the positions of the first and second receive optical fibers are used to determine the angular position of the fiber array about the Z-direction. If the positioning stage holding the fiber array is capable of motion about the Z-direction, the angular position of the fiber array about the Z-direction is adjusted at block 114 by rotating the second sensor positioning stage about the Z-direction.

Figure 15:
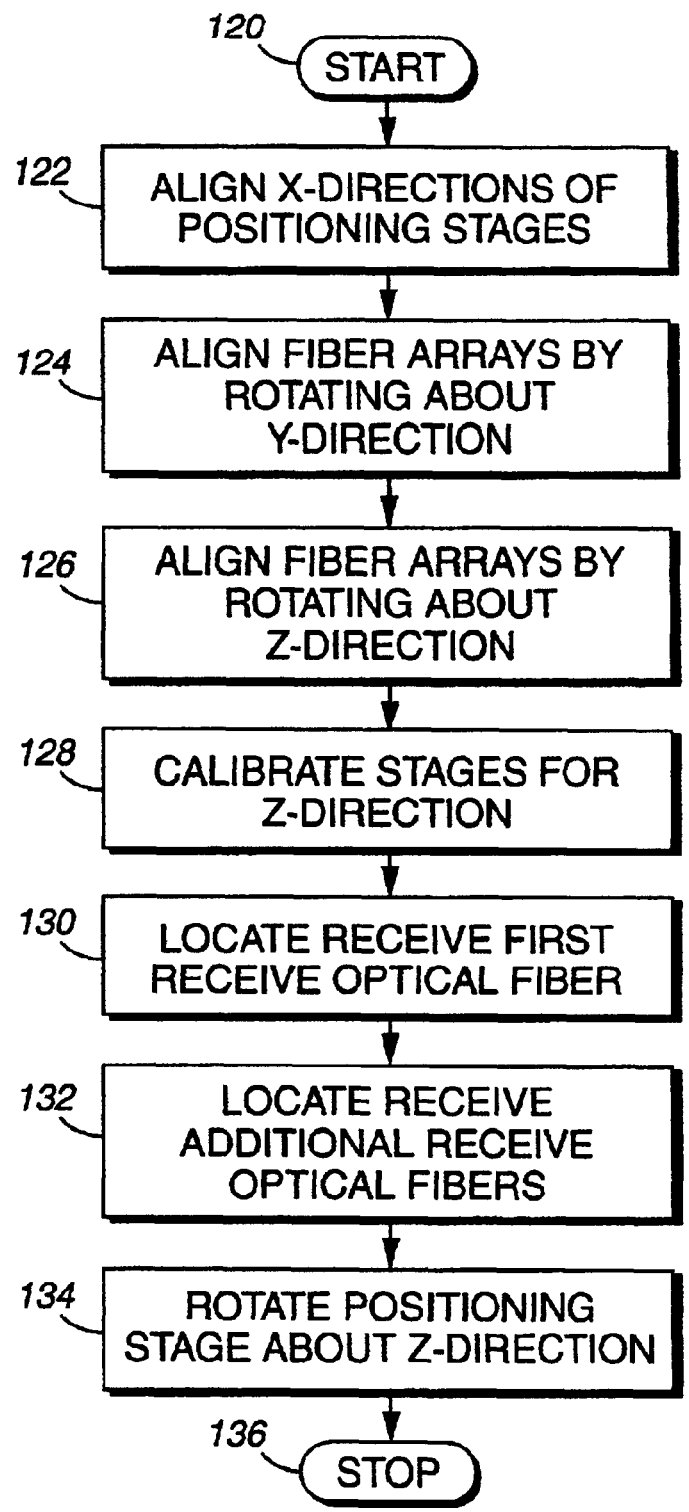
FIG. 15 is a flow chart depicting a method for alignment and calibration of an optical system in accordance with the invention.

FIG. 15 is a flow chart depicting a method for aligning and calibrating an optical system. The system includes a device presenting positioning stage capable of motion in an X-direction that supports an object and one or more sensor positioning stages each capable of motion in orthogonal X-, Y- and Z-directions. Each sensor positioning stage has an optical edge detector and a fiber array attached to it. The method begins at start block 120 and proceeds by aligning the X-direction of each sensor positioning stage to be parallel to the X-direction of the device positioning stage at block 122, adjusting the rotation of each fiber array by rotating a corresponding sensor positioning stage about the Y-direction at block 124 and adjusting the rotation of at least one of the fiber arrays by rotating the Z-direction at block 126. Once the system is aligned it can be calibrated. Calibration proceeds by calibrating each sensor positioning stage in the Z-direction at block 128 and calibrating each sensor positioning stage in the X-direction at block 130. The location of a receive optical fiber in one of the sensor positioning stages may then be detected at block 132. The locations of additional receive optical fibers in the fiber array may also be determined at block 134. From knowledge of the measured positions and the known pattern of the fiber array, the roll angle misalignment is calculated and the misalignment is removed at block 134 by rotating the positioning stage about the Z-direction.

Figure 16:
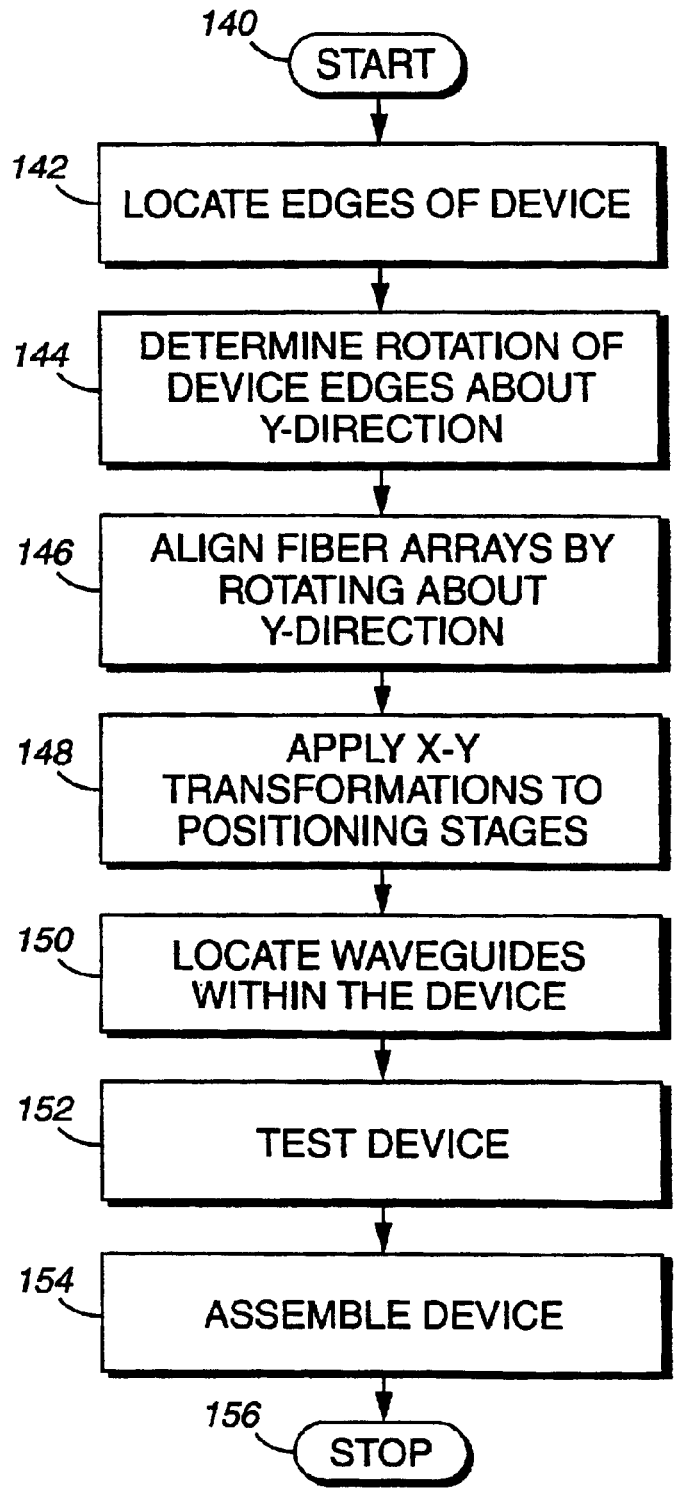
FIG. 16 is a flow chart depicting a method for alignment of an optical system, relative to a device under test, in accordance with the invention.

FIG. 16 is a flow chart depicting a method for aligning an optical system to a device under test. The system includes a device presenting positioning stage capable of motion in an X-direction that supports the device under test. The system also includes one or more sensor positioning stages each capable of motion in orthogonal X-, Y- and Z-directions with each sensor positioning stage having an optical edge detector and a fiber array attached to it. The method begins at start block 140 and proceeds by locating the edges of the device under test at block 142, determining the rotation about the Y-direction of the device under test by making measurements of the Z-position of the edge of the device under test at at least two different X-positions at block 144 and rotating the fiber arrays to be parallel to the edges of the device under test at block 146. X-Y transforms are then applied at block 148 to the directions of the one or more sensor positioning stages, so that the positioning stages can track the edges of the device under test. At block 150 the locations of waveguides within the device under test are detected by scanning surfaces of the device under test in the X- and Y-directions using the fiber arrays. At block 152 the actual testing of the device is performed and, optionally, the device is assembled at block 154. The process terminates at block 156.

While the invention has been particularly shown and described with reference to a preferred embodiment, it will be understood by those skilled in the art that various changes in form and detail may be made therein without departing from the spirit and scope of the invention.

What is claimed is:

1. A method for aligning an optical system, said system comprising a device presenting positioning stage capable of motion in an X-direction, an object attached to the device presenting positioning stage, one or more sensor positioning stages each capable of motion in an X-direction and a Z-direction substantially orthogonal to said X-direction and each having an optical edge detector attached thereto, said method comprising for each sensor positioning stage of the one or more sensor positioning stages:

positioning the optical edge detector of the sensor positioning stage at a first X-position in the X-direction;

causing the sensor positioning stage to move the optical edge detector in the Z-direction to detect a first Z-position of an edge of the object;

causing the sensor positioning stage to move the optical edge detector by a distance x in the X-direction to a second X-position;

causing the device positioning stage to move the object by a distance x in the X-direction;

causing the sensor positioning stage to move the optical edge detector in the Z-direction to detect a second Z-position of an edge of the object; and determining an angle between the X-direction of the sensor positioning stage and the edge of the object according to the first Z-position, the second Z-position and the distance x.

2. A method in accordance with claim 1 wherein an angle θ between the edge of the object and the axis of a sensor positioning stage of the one or more sensor positioning stages is determined to be $$\theta = \tan^{-1}\left(\frac{z(x_2) - z(x_1)}{x_2 - x_1}\right),$$

where $x_1$ and $x_2$ denote said first and second X-positions respectively and $z(x_1)$ and $z(x_2)$ denote said first and second Z-positions respectively.

3. A method as in claim 1, wherein the object is a fiducial having a first edge parallel to the X-direction of the device positioning stage.

4. A method as in claim 1, wherein the object is a device under test.

5. A method for aligning an optical system, said system comprising a first sensor positioning stage capable of motion in an X-direction and a Z-direction orthogonal to the X-direction, an optical edge detector attached to the first sensor positioning stage, a second sensor positioning stage capable of rotary motion in a Y-direction, orthogonal to the X-direction and the Z-direction, and an object attached to the first sensor positioning stage, said method comprising:

positioning said first optical edge detector at a first X-position in the X-direction;

causing the first sensor positioning stage to move the optical edge detector in the Z-direction to detect a first Z-position of an edge of the object;

causing the first positioning stage to move the optical edge detector by a distance x in the X-direction to a second X-position;

causing the second sensor positioning stage to move the object by a distance x in the X-direction;

causing the first sensor positioning stage to move the optical edge detector in the Z-direction to detect a second Z-position of an edge of the object;

determining an angle between the X-direction of the first sensor positioning stage and the edge of the object according to the first Z-position, the second Z-position and the distance x; and rotating said second sensor positioning stage about the Y-direction in accordance with the angle between the X-direction of the first sensor positioning stage and the edge of the object.

6. A method for calibrating an optical system, said system comprising a device presenting positioning stage capable of motion in an X-direction, a object attached to the device presenting positioning stage, a first sensor positioning stage of a plurality of sensor positioning stages each capable of motion in an X-direction and a Z-direction substantially orthogonal to said X-direction and each having an optical edge detector attached thereto, said method comprising:

positioning the optical edge detector of the first sensor positioning stage at an X-position in the X-direction;

causing the first sensor positioning stage to move the optical edge detector in the Z-direction to detect a first Z-position of an edge of the object;

for each additional sensor positioning stage of the plurality of sensor positioning stages:

positioning the optical edge detector of the additional sensor positioning stage at an X-position in the X-direction;

causing the additional sensor positioning stage to move the optical edge detector of the additional sensor positioning stage in the Z-direction to detect a second Z-position of an edge of the object; and calibrating the edge detector of the additional sensor positioning stage so that the second Z-position is equal to the first Z-position.

7. A method for calibrating an optical system, said system comprising a device presenting positioning stage capable of motion in an X-direction, a object attached to the device presenting positioning stage, a first sensor positioning stage of a plurality of sensor positioning stages each capable of motion in an X-direction and a Z-direction substantially orthogonal to said X-direction and each having an optical edge detector attached thereto, said method comprising:

positioning the optical edge detector of the first sensor positioning stage in the Z-direction at an Z-position on an edge of the object substantially parallel to the Z-direction; and causing the first sensor positioning stage to move the optical edge detector in the X-direction to detect a first X-position of the edge of the object substantially parallel to the Z-direction;

for each additional sensor positioning stage of the plurality of sensor positioning stages:

positioning the optical edge detector of the additional sensor positioning stage in the Z-direction at the Z-position on the edge of the object substantially parallel to the Z-direction;

causing the additional sensor positioning stage to move the optical edge detector of the additional sensor positioning stage in the X-direction to detect a second X-position of the edge of the object substantially parallel to the Z-direction; and calibrating the edge detector of the additional sensor positioning stage so that the second X-position is equal to the first X-position.

8. A method for aligning an optical system, said system comprising a first sensor positioning stage capable of motion in orthogonal X-, Y- and Z-directions and having an transmit optical fiber attached thereto and a second positioning stage having a fiber array with a surface substantially planar to the X- and Y-directions and containing a receive optical fiber terminating in the surface, said method comprising:

causing light to be transmitted from the transmit optical fiber;

detecting light received through said receive optical fiber; and adjusting the relative positions of the transmit and receive optical fibers in the X- and Y-directions to cause the detected light to be at a maximum.

9. A method as in claim 8, further comprising:
detecting the Z-position of the surface of the fiber array;
adjusting the relative positions of the transmit optical fiber and the fiber array so that they are close together in the Z-direction.

10. A method as in claim 9, further comprising:
adjusting the relative positions of the transmit optical fiber and the fiber array in the X-, Y- and Z-directions until the power of the detected light is less than 0.05 dB of the power of the transmitted light.

11. A method for aligning an optical system, said system comprising a first sensor positioning stage capable of motion in orthogonal X-, Y- and Z-directions and having an transmit optical fiber attached thereto and a second sensor positioning stage having a fiber array with a surface substantially parallel to the Y-directions and containing two or more receive optical fiber terminating in the surface, said method comprising:

causing light to be transmitted from the transmit optical fiber;

detecting light received through a first receive optical fiber of the two or more optical fibers;

adjusting the relative positions of the transmit optical fiber and the first receive optical fiber in the X- and Y-directions to cause the detected light to be at a maximum, thereby determining a position of the first receive optical fiber;

detecting light received through a second receive optical fiber of the two or more optical fibers;

adjusting the relative positions of the transmit optical fiber and the second receive optical fiber in the X- and Y-directions to cause the detected light to be at a maximum, thereby determining a position of the second receive optical fiber; and determining from the positions of the first and second receive optical fibers an angular position of the fiber array about the Z-direction.

12. A method as in claim 11, wherein said second positioning stage is capable of motion about the Z-direction, further comprising:

adjusting the angular position of the fiber array about the Z-direction by rotating the second sensor positioning stage about the Z-direction.

13. A method for aligning an optical system, said system comprising a device presenting positioning stage capable of motion in an X-direction, a object attached to the device presenting positioning stage, one or more sensor positioning stages each capable of motion in orthogonal X-, Y- and Z-directions each sensor positioning stage of the one or more sensor positioning stages having an optical edge detector and a fiber array attached thereto, said method comprising:

aligning the X-direction of each sensor positioning stage to be parallel to the X-direction of the device positioning stage;

adjusting the rotation of each fiber array by rotating a corresponding sensor positioning stage about the Y-direction;

adjusting the rotation of at least one of the fiber arrays by rotating the Z-direction;

calibrating each sensor positioning stage in the Z-direction; and calibrating each sensor positioning stage in the X-direction.

14. A method as in claim 13, further comprising:
detecting the location of a receive optical fiber in one of said one or more sensor positioning stages.

15. A method as in claim 13, further comprising:
detecting the locations of a plurality of receive optical fibers in the fiber array one of said one or more sensor positioning stages; and adjusting the rotation of the fiber array by rotating the Z-direction by an amount determined by the detected locations of the plurality of receive optical fibers.

16. A method for aligning an optical system to a device under test, said system comprising a device presenting positioning stage capable of motion in an X-direction, a device under test supported by the device presenting positioning stage, one or more sensor positioning stages each capable of motion in orthogonal X-, Y- and Z-directions with each sensor positioning stage of the one or more sensor positioning stages having an optical edge detector and a fiber array attached thereto, said method comprising:

locating the edges of the device under test;

determining the rotation about the Y-direction of the device under test by making measurements of the Z-position of the edge of the device under test at at least two different X-positions;

rotating the fiber arrays to be parallel to the edges of the device under test;

applying X-Y transforms to the directions of the one or more sensor positioning stages; and detecting locations of waveguides within the device under test by scanning surfaces of the device under test in the X- and Y-directions using the fiber arrays.

17. A method as in claim 16, further comprising:

generating a map of the locations of the waveguides within the device under test;

selecting a waveguide; and aligning the system to the selected waveguide.

18. A system for detecting optical devices, said system comprising:

a device presenting positioning stage capable of motion in an X-direction and capable of supporting a device under test;

a first sensor positioning stage capable of motion in orthogonal X-, Y- and Z-directions;

a second sensor positioning stage capable of motion in orthogonal X-, Y- and Z-directions;

a first optical edge detector attached to said first sensor positioning stage; and a second optical edge detector attached to said first sensor positioning stage.

19. A system as in claim 18, further comprising:

a first fiber array attached to said first sensor positioning stage, said first fiber array having a transmit fiber sensor embedded therein; and a second fiber array attached to said second sensor positioning stage, said first fiber array having one or more receive fiber sensors embedded therein.

20. A system as in claim 18, further comprising:

a fiducial attached to said device presenting positioning stage.

21. A system as in claim 18, wherein one of said first and second sensor positioning stages is capable of rotation about two axes.

22. A system as in claim 18, wherein said first and second edge detectors each comprise a transmit optical fiber optically coupled to a laser light source and a receive optical fiber optically coupled to a light power detector.

23. A method for aligning an optical system, said system comprising a first sensor positioning stage capable of motion in an X-direction and a Z-direction orthogonal to the X-direction, an optical edge detector attached to the first sensor positioning stage, a second sensor positioning stage capable of rotary motion in a Y-direction, orthogonal to the X-direction and the Z-direction, and an object attached to the first sensor positioning stage, said method comprising:

positioning said first optical edge detector at a position in the X-direction;

causing the first sensor positioning stage to move the optical edge detector in the Z-direction;

detecting a first Z-position of an edge of the object at the X-position of a first fiber sensor of the optical edge detector;

detecting a second Z-position of the edge of the object at the X-position of a second fiber sensor of the optical edge detector, said first and second fiber sensors being separated by a distance x in the X-direction;

determining an angle between the X-direction of the first sensor positioning stage and the edge of the object according to the first Z-position, the second Z-position and the distance x; and rotating said second sensor positioning stage about the Y-direction in accordance with the angle between the X-direction of the first sensor positioning stage and the edge of the object.

* * * * *